3,180,854
DOUBLE DIAMINE MODIFICATION OF URETHANE PREPOLYMERS
A. David Schneider, Scarsdale, N.Y., and Timothy V. Peters, Jr., Barrington, R.I., assignors, by mesne assignments, to Polythane Corporation, Rumford, R.I., a corporation of Delaware
No Drawing. Filed June 14, 1961, Ser. No. 116,949
7 Claims. (Cl. 260—77.5)

This invention relates to the process of producing polymeric products and more particularly to the production of elastic filaments derived from essentially linear segmented polymers.

The solution method for the production of shaped articles based on the class of segmented polymers commonly referred to as polyurethanes can, in general, conveniently be divided into three phases. The first phase involves the production of a so-called prepolymer which can be prepared by heating a difunctional hydroxyl terminated polymer with a molar excess of an organic diisocyanate to produce a low molecular weight isocyanate-terminated prepolymer. The second phase involves the reaction of the prepolymer with a compound containing, in general, at least two active hydrogens in the presence of a solvent to form a solution containing the resultant polymer or elastomer. The third phase involves the formation of the polymer in a suitable or desired shape such as by extruding the polymer solution through a spinnerette to form filaments or by casting or dip-coating the solution to form self supporting films.

This invention is particularly concerned with the latter two phases involving the reaction of a prepolymer with a diamine in solution and subsequent casting, dip-coating, extrusion or spinning of the polymer solution to form the elastic or rubber-like filaments, self supporting films or other desirable forms and shapes.

One object of this invention is to reduce the amount of solvent required in forming the polymer solution. A further object is to produce a polymer solution having a high solids content which will permit significantly higher spinning or extruding speeds and otherwise improve the economy in casting or molding from the solution. A further object of this invention is to provide a process which will also permit the use of higher molecular weight diamines which heretofore could not be advantageously used to form a suitable polymer solution.

The objects of this invention are accomplished by reacting a low molecular weight difunctional hydroxy-terminated polymer such as a polyester glycol or a polyether glycol with a molar excess of an organic diisocyanate to form a prepolymer. The prepolymer having terminal isocyanate groups is then reacted in solution with less than the stoichiometric amount of a diamine to form what will hereinafter be referred to for convenience as a semi-polymer solution. The semi-polymer solution is then formed into the desired shape and reacted with additional diamine to form the elastic products. The semi-polymer solution can, for example, be extruded or spun through a spinnerette into a bath containing water and additional diamine.

Various difunctional hydroxyl-terminated polymers including polyether glycols and polyester glycols can be used to form the prepolymers according to this invention. The molecular weight of the difunctional hydroxyl-terminated polymers can advantageously be maintained above about 700 and preferably between about 1,000 and 4,000. Difunctional hydroxy terminated polymers having a molecular weight below about 700 can also be used, but they generally do not result in end products having elasticity as advantageous as from those hydroxy polymers of higher molecular weight. The valve of such products produced with hydroxy polymers having lower molecular weight will depend upon the end use of the product and the elasticity desired for that particular use. Generally as the molecular weight of the hydroxy polymer is decreased, the elongation decreases and the modulus increases. The use of a polymer having a molecular weight in excess of about 4,000 presents considerable difficulties in the subsequent formation of the polymer solution and the transformation of such solutions into suitable and useful products due to difficulties in maintaining acceptable rheological properties in the resulting polymer solutions.

The high molecular weight polyester glycols which can be used according to this invention are those which contain terminal hydroxy groups. The esters can be prepared by various known methods by reacting diacids, diesters, or diacid halides with glycols. Suitable glycols which can be used to prepare the polyester glycols include polyalkylene glycols such as methylene, ethylene, propylene and butylene glycols. Substituted polyalkylene glycols such as 2,2-dimethyl-1,3-propene diol as well as heterocyclic glycols such as cylclohexanol can also be used. Examples of acids which can be used to prepare the polyester glycols include succinic, adipic, suberic, sebacic, terephthalic, as well as various alkyl and halogen substituted derivatives of the acids. The polyester glycol may for example be prepared by reacting the proper molar ratio of the acids or ester-forming derivatives of the acids with the glycols to produce the high molecular weight polymers. The polyester glycols prepared by reacting 2 mols of polyethylene glycol or polypropylene glycol with 1 mole of adipic acid and then removing the glycol with heat and vacuum until a molecular weight of about 2,000 is reached can advantageously be used to form prepolymers according to this invention.

The polyether glycols which can be used to form the prepolymers according to this invention are polyalkylene ether glycols having terminal hydroxy groups. The polyalkylene ether glycols can be prepared in known manners and are generally prepared by the polymerization of cyclic ethers such as alkylene oxides or from condensation of glycols. The polyalkylene ether glycols are represented by the formula $HO(RO)_nH$ in which R is an alkylene radical and $n$ is an integer sufficiently large so that the polyalkylene glycol has a molecular weight in excess of about 700 and preferably in excess of about 1,000. The polyalkylene ether glycols can be prepared by copolymerizing mixtures of different alkylene oxides or glycols. Examples of polyalkylene ether glycols which can be used in this invention include polypropylene ether glycol, polytetramethylene ether glycol, polyethylene ether glycol, 1,2-polydimethylethylene ether glycol, polydecamethylene ether glycol, and so forth. Further examples of polyalkylene ether glycols which can be used according to this invention are described in Patent No. 2,492,959.

Various organic diisocyanates can be used to react with the difunctional hydroxy polymers to form the prepolymer. Aromatic, aliphatic, as well as cycloaliphatic diisocyanates or combinations thereof, can be used. Representative diisocyanates include 4-methyl-m-phenylene diisocyanate, m-phenylene diisocyanate, 4,4'-biphenylene diisocyanate, methylene bis(4-phenylisocyanate), 4-chloro-1,3-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), and 1,5-tetrahydronaphthalene diisocyanate. Arylene diisocyanates, i.e., those in which each of the isocyanate groups is attached directly to an aromatic ring are preferred. In general, they react more rapidly than do the alkylene diisocyanates. The diisocyanates may contain other substituents, although those which are free from reactive groups other than the two isocyanate groups are ordinarily preferred. In the case of the aromatic compounds the isocyanate groups may be attached either to the same or to different rings. Dimers of the monomeric diisocyanates and di(isocyanatoaryl)-ureas, such as di(3-isocyanate-4-methylphenyl) urea may also be used.

The patents to Frankenburg, No. 2,957,852, Windemuth, No. 2,948,691, and the Hill, No. 2,929,800, further show how the prepolymers can be prepared, as well as the reactants used in their preparation according to this invention.

It has heretofore been customary to prepare a so-called polymer solution by reacting a prepolymer with a diamine in essentially stoichiometric proportions in admixture with a solvent to produce a high molecular weight polyfer solution suitable for formation into films, extrusion into a water bath to form filaments and so forth. These solutions generally contain about 15 to 25% by weight polymer. The method of this invention involves an improvement in the preparation of a polymer solution and the transformation of the polymer solution into elastic products.

According to this invention the prepolymer is reacted with a diamine in less than stoichiometric proportions to form a semi-polymer solution. The prepolymer is incompletely reacted and still contains unreacted terminal isocyanate groups. The semi-polymer is then spun into a water bath containing additional diamine to form elastic filaments, or used in other known manners to form various shaped elastic products, and the reaction of the prepolymer completed.

The amount of diamine that can be used to form the semi-polymer solution can be varied considerably depending on a number of factors such as the particular diamine used to react with the prepolymer, the particular diamine used to react wtih the semi-polymer solution to complete the reaction, the reactants used to form the prepolymer, the properties desired to be possessed by the end products and so forth. These and other factors will be apparent to those skilled in the art and the exact amount of diamine that can most advantageously be used to prepare the semi-polymer can be readily determined by those skilled in the art by routine experimentation. Generally, the reaction of the prepolymer with the diamine in a molar ratio of about 5:4 is advantageous. As the molar ratio of the prepolymer and diamine approach 1:1, the advantages of this invention tend to be decreased. As the 1:1 ratio is approached, the viscosity of the solution increases, requiring the use of additional undesirable solvent, which also results in a decrease of the polymer solids content of the solution. With many intermediates it is not possible, as a practical matter, to extrude, or otherwise form, a prepolymer into a final product having desirable and useable elastic products and it is necessary to use a sufficient amount of a diamine to form a semi-polymer solution having suitable characteristics for formation into useful elastic products. As the molar ratio of prepolymer to diamine is increased, polymer solutions tend to lose their advantageous extrusion characteristics and the formation of products therefrom become more difficult. The amount of diamine reacted with the prepolymer should generally be selected on the basis of the extrudability of the semi-polymer solution and the amount of solvent required to produce an extrudable semi-polymer solution.

The gradual addition of the diamine to the prepolymer solution results in the gradual increase in the viscosity of the solution. The extent and rate of the viscosity increase will depend to a great degree on the particular diamine being used to form the semi-polymer. It is advisable to add sufficient diamine to increase the viscosity of the solution to at least about 50 poises to obtain a solution which can be easily extruded. Generally, it is more advantageous to extrude solutions having viscosities between about 100 to 500 poises.

The amount of diamine which can be used in the bath to complete the reaction of the semi-polymers can vary considerably as will be apparent to those skilled in the art. It is generally advantageous to insert into the bath considerably more diamine than will be required to react with all of the semi-polymer to be extruded therein. As the diamine in the bath is used up, it can be continuously or intermittently replenished so that the bath concentration of diamine is maintained essentially constant.

Various primary and secondary diamines can be used to form the semi-polymers according to this invention including aliphatic, heterocyclic and inorganic diamines. Generally, the same diamines can be used as have previously been known to be useful in the prior process in which substantially a stoichiometric amount of diamine is reacted with the prepolymer. The particular diamines which can be used according to this invention will thus be apparent to those skilled in the art. Specific examples of a number of diamines which can be used are hydrazine, ethylene diamine, piperazine, 1,4-diamine-2-methyl piperazine, 1,4-diamine-2,5-dimethyl piperazine, methylimino bis propylamine, etc. The additional diamines which can be used to complete the reaction of the semi-polymer to form the elastic products can comprise the same class of diamines as disclosed above. Solvent recovery is obviously simplified if the diamine has a vapor pressure either much lower or much higher than the solvent used in the process. The particular diamines or the particular pair of different diamines used, however, will depend mainly upon the properties and characteristics desired in the final elastic product.

Various solvents can be used to form the semi-polymer solutions as will be apparent to those skilled in the art such as dimethyl formamide, dimethyl sulfoxide, dimethyl acetamide, etc. As above stated, the selection of a diamine and solvent having substantially different vapor pressures is advantageous to simplify solvent recovery.

The bath containing the diamine into which the semi-polymer can be extruded or dipped can be composed of a water solution of a diamine or more advantageously a water-solvent solution of a diamine. The bath into which the semi-polymer solution is extruded or dipped builds up its solvent content during the process due to extraction of the solvent from the semi-polymer solution but this additional solvent can be removed during the process. The use of a bath also containing solvent facilitates solvent recovery and the solvent is generally continuously removed from the bath if a solvent-water bath is employed to maintain the solvent content at a desirable level, e.g. 40–60% solvent.

In the formation of filaments the extrusion speeds obtainable will depend mainly upon the reactivity of the diamine employed in the bath with the isocyanate semi-polymer, the diffusion rate of the diamine, the bath temperature, etc. The length of the bath also has an effect on the extrusion or spinning speed. Extrusion speeds of 150 feet per minute and higher have been obtained using a bath approximately 6 feet in length containing about 10% by weight hydrazine. The 150 feet per minute extrusion speed referred to above is not limiting since higher extrusion speeds can be obtained. The above extrusion speed was carried out with a semi-polymer solution containing approximately 50% solids. In this particular instance, a semi-polymer solution containing 50% solids was advantageous, however, semi-polymer solutions can be prepared according to this invention containing solids in excess of 50%.

Different diamines can be used to advantage according to this invention in the preparation of the semi-polymer and in the bath. The use of different diamines permits the preparation of elastic polymers having different and advantageous properties not otherwise obtainable. The use of different diamines in the preparation of the semi-polymer and in the coagulating bath results in the formation of block polymers and widens the usefulness of the available diamines as well as the range of the properties which might be obtainable in the formation of the elastic polymers. The use of a single diamine may produce an elastic polymer having certain desirable properties such as color, elongation at room temperature, etc., but may be deficient in other areas such as deterioration. Different diamines can be used to eliminate some of the disadvantages of single diamines and yet retain the advantageous properties of another different diamine. For example, use of methylimino bis propylamine does not produce an elastic product having acceptable physical properties. The preparation of a semi-polymer with a diamine such as hydrazine and the extrusion of this semi-polymer into a bath containing methylimino bis propylamine to complete the reaction will result in a novel block polymer which retains a considerable number of the advantageous properties of methylimino bis propylamine without adversely affecting the good physical properties obtainable with hydrazine alone. Further examples of combinations of different diamines which can be used are disclosed in the specific working examples.

The semi-polymer solutions prepared according to this invention require a small amount of solvent in order to render the solutions suitable for subsequent use in the formation of films, filaments, etc. Semi-polymer solutions can thus be preparaed containing one part of solvent for each part of the semi-polymer. In the polymer solutions prepared according to the prior art in which substantially stoichiometric proportions of the diamine and prepolymer are used, solvent requirements per part of polymer to produce a suitable polymer solution are in the range of 4 to 6 parts. This significant reduction in the amount of solvent required also produces spinnable or formable solutions having a higher solids content. The semi-polymer solutions of this invention having a high solids content permits higher spinning and extruding speeds. Approximately twice the amount of semi-polymer or solids can be introduced into the extrusion bath than was previously permissible. In addition, when using the solutions to form articles by the dip coating process, a layer can be formed around the object and built up thereon which would require fewer dippings into the polymer solution also significantly lessens the expense and time involved in solvent recovery.

The semi-polymer solutions of this invention can most advantageously be used to form filaments by solution extrusion techniques but they can also be used for the formation of other shaped articles as will be apparent to those skilled in the art.

The method of this invention also advantageously permits the use of a wider range of diamines. Generally, as the molecular weight of straight chain diamines increases it becomes more difficult to form a suitable polymer solution since the higher molecular weight straight chain diamines set up and gel preventing extrusion or the further forming of the polymer into articles of commerce. For example, if a prepolymer was reacted with hexamethylene diamine in a molar ratio of substantially 1:1, the polymer solution would gel. The reaction of a prepolymer with hexamethylene diamine in less than the stoichiometric amount forms a viscous solution suitable for the formation of articles and subsequent reaction with additional diamines. This difficulty in the use of diamines is not as prevalent where the diamine is branched such as with methylimino bis propylamine or cyclic as a piperazine.

The method of producing the elastic filaments of this invention is illustrated by the following examples, parts are by weight.

Example 1

1200 parts of a poly(propylene adipate) glycol having a molecular weight of about 2000 were heated to 60° C. in an inert nitrogen atmosphere and then thoroughly mixed with 303 parts methylene bis(4-phenylisocyanate). The mixture was then heated to 100° C. in an inert nitrogen atmosphere and under anhydrous conditions and held at this temperature for 90 minutes. The resulting isocyanate terminated prepolymer was then cooled to 50° C. and diluted with 1500 parts of dimethyl formamide to yield a 50% solution of the isocyanate terminated prepolymer. The prepolymer solution was then divided into two equal parts.

Example 2

A 10% by weight solution of anhydrous hydrazine in dimethyl formamide was slowly added with vigorous stirring to one part of the divided prepolymer solution of Example 1 until the solution obtained a viscosity of 150 poises to form a semi-polymer. The semi-polymer still contained a plurality of terminal NCO groups. The prepolymer:hydrazine ratio reacted to form the semi-polymer was about 5:4. The resulting viscous solution was then degassed under vacuum and then extruded through a spinnerette containing 10 holes each 0.004 inch in diameter into a water-bath containing 10% by weight hydrazine resulting in the formation of elastic filaments. The resulting filaments were rinsed in a water bath and dried at 125° C. for five minutes. The dried filaments had an elongation of 550% and a modulus at 300% equal to 2200 lbs./sq. in. The extrusion of the same viscous semi-polymer solution into a water bath did not produce filaments having useable elastic properties.

Example 3

Another portion of the same viscous semi-polymer solution of Example 2 was extruded into a water-bath containing 20% by weight of ethylene diamine. The formed filaments were then rinsed in a water bath and dried at 125° C. for 5 minutes. The resulting elastic filaments had an elongation of 625% and a modulus at 300% equal to 1850 lbs./sq. in.

Example 4

A 10% by weight solution of anhydrous ethylene diamine in dimethyl formamide was slowly added with a vigorous stirring to the second half of the prepolymer solution prepared in Example 1 until the solution reached a viscosity of about 180 poises. The resulting semi-polymer solution was then extruded through a spinnerette containing 10 holes each 0.004 inch in diameter into a water bath containing 10% by weight hydrazine to form filaments therefrom. The formed filaments were then rinsed in a water bath and dried at 125° C. for 5 minutes. The resulting elastic filaments had an elongation of 700% and a modulus at 300% equal to 2050 lbs./sq in.

Example 5

Another portion of the above semi-polymer solution in Example 4 prepared by reacting the prepolymer with a 10% solution of anhydrous ethylene diamine in dimethyl formamide was extruded into a water-bath containing 20% by weight ethylene diamine to form filaments therefrom. The formed filaments were then dried at 125° C. for 5 minutes. The dried filaments had an elongation of 575% and a modulus at 300% equal to 2300 lbs./sq. in.

Example 6

1200 parts of a difunctional polypropylene oxide glycol having a molecular weight of 2000 was heated to 60° C. in an inert nitrogen atmosphere and then mixed with 303 parts of methylene bis(4-phenylisocyanate). The mixture was heated to 100° C. in an inert nitrogen atmosphere and under anhydrous conditions and held at this temperature for 90 minutes. The resulting prepolymer was then cooled to 50° C. and diluted with 1500 parts of dimethyl formamide to yield a 50% solution of the isocyanate terminated prepolymer. The prepolymer solution was then divided into two equal parts.

Example 7

A 10% by weight solution of anhydrous hydrazine and dimethyl formamide was then slowly added to one-half of the prepolymer solution of Example 6 with vigorous stirring until a viscosity of 210 poises was obtained. The resulting viscous solution was then degassed under vacuum and extruded through a spinnerette containing 10 holes each 0.004 inch in diameter into a water-bath containing 10% by weight hydrazine. The filaments formed in the bath were then rinsed in a water bath and dried at 125° C. for 5 minutes. The resulting elastic filaments had an elongation of 600% and a modulus at 300% equal to 1450 lbs./sq. in.

Example 8

Another portion of the same semi-polymer solution of Example 7 was extruded in the same manner into a waterbath containing 20% by weight ethylene diamine. The formed filaments were then also rinsed in water and similarly dried. The resulting filaments had an elongation of 675% and a modulus at 300% equal to 1500 lbs./sq. in.

Example 9

A 10% by weight solution of anhydrous ethylene diamine and dimethyl formamide was added to the other half of the prepolymer solution of Example 6 in the same manner until the viscosity of 240 poises was obtained. The viscous semi-polymer solution was then degassed and extruded in the same manner into a water-bath containing 10% by weight hydrazine. The formed filaments were similarly rinsed in water and dried at 125° C. for 5 minutes. The resulting elastic filaments had an elongation of 575% and a modulus at 300% equal to 1300 lbs./sq. in.

Example 10

Another portion of the ethylene diamine semi-polymer solution of Example 9 was extruded in the same manner into a water-bath containing 20% by weight ethylene diamine. The formed filaments were similarly rinsed and dried and had an elongation of 600% and a modulus at 300% equal to 1200 lbs./sq. in.

Example 11

1200 parts of a poly(propylene adipate) glycol having a molecular weight of about 2000 were heated to 60° C. in an inert atmosphere and then thoroughly mixed with 303 parts of methylene bis(4-phenyl isocyanate). The mixture was then heated to 100° C., held at this temperature for 90 minutes, cooled to 50° C. and diluted with 1500 parts of dimethylsulfoxide to a yield of 50% solution of an NCO-terminated prepolymer. The prepolymer solution was then rapidly stirred and a 10% by weight solution of anhydrous hexamethylene diamine in dimethylsulfoxide was slowly added until the solution reached a viscosity of 200 poises. The resulting high solids semi-polymer solution was then degassed and extruded through a spinnerette containing 10 holes each 0.004 inch in diameter into a bath containing 10% by weight hydrazine, 45% by weight dimethylsulfoxide and 45% by weight water to form fibers therefrom. The formed fibers were then rinsed in water and dried at 130° C. for 10 minutes. The dried fibers had an elongation of 650% and a modulus at 300% equal to 1800 lbs./sq. in.

We claim:

1. The method of preparing a synthetic elastomeric copolymer which comprises heating a difunctional hydroxy-terminated polymer having a molecular weight above about 700 and selected from the group consisting of hydroxy-terminated polyesters and polyalkylene ether glycols with an organic diisocyanate to produce a low molecular weight isocyanate terminated prepolymer, reacting the resulting isocyanate terminated prepolymer with a first diamine selected from the group consisting of hydrazine, hexamethylenediamine, and ethylenediamine, the amount of said first diamine being insufficient to react with all of the isocyanate groups on said prepolymer, thus forming a semi-polymer containing terminal isocyanate groups, and thereafter reacting the thus formed semi-polymer with an aqueous solution containing a second diamine different from said first diamine and selected from the group consisting of hydrazine, ethylenediamine and methylimino bis propylamine, the amount of said second diamine being in excess of that required to react with all of the remaining isocyanate groups on said semi-polymer, to form a linear block copolymer.

2. The method of claim 1 wherein the hydroxy terminated polymer is a poly(alkylene oxide) glycol.

3. The method of claim 1 wherein said first diamine is hydrazine.

4. The method of claim 1 wherein said second diamine is hydrazine.

5. The method of claim 1 wherein said first diamine is hydrazine and said second diamine is ethylene diamine.

6. The method of claim 1 wherein said first diamine is hexamethylene diamine and said second diamine is hydrazine.

7. The method of claim 1 wherein said first diamine is hydrazine and said second diamine is methylimino bis propylamine.

References Cited by the Examiner

UNITED STATES PATENTS

| | | | |
|---|---|---|---|
| 2,692,874 | 10/54 | Langerak | 260—77.5 |
| 2,778,810 | 1/57 | Muller | 260—77.5 |
| 2,813,775 | 11/57 | Steuber | 18—54 |
| 2,813,776 | 11/57 | Koller | 18—54 |
| 2,912,414 | 11/59 | Schultheis | 260—77.5 |
| 2,929,800 | 3/60 | Hill | 260—77.5 |
| 2,965,437 | 12/60 | Blomberg | 260—75 |
| 2,987,504 | 6/61 | Wagner | 260—75 |
| 3,047,356 | 7/62 | Polansky | 260—75 |

LEON J. BERCOVITZ, *Primary Examiner.*

W. STHEVENSON, DONALD E. CZAJA, *Examiners.*